United States Patent
Davis

(10) Patent No.: US 6,942,423 B2
(45) Date of Patent: Sep. 13, 2005

(54) MIGRATORY FISH CHANNEL ASSOCIATED WITH ONE OR MORE DAMS IN A RIVER

(75) Inventor: Robert E. Davis, P.O. Box 695, Royal City, WA (US) 99357

(73) Assignee: Robert E. Davis, Royal City, WA (US)

(*) Notice: Subject to any disclaimer, the term of this patent is extended or adjusted under 35 U.S.C. 154(b) by 0 days.

(21) Appl. No.: 10/786,714

(22) Filed: Feb. 23, 2004

(65) Prior Publication Data

US 2004/0165955 A1 Aug. 26, 2004

Related U.S. Application Data

(63) Continuation-in-part of application No. 10/324,205, filed on Dec. 19, 2002, now abandoned.
(60) Provisional application No. 60/342,039, filed on Dec. 26, 2001.

(51) Int. Cl.[7] ............................... E02B 8/08
(52) U.S. Cl. .................. 405/81; 405/103; 405/118
(58) Field of Search ................. 405/80–83, 87, 405/118, 119, 121, 103, 104; 119/219, 220

(56) References Cited

U.S. PATENT DOCUMENTS

| | | | | |
|---|---|---|---|---|
| 3,772,891 A | * | 11/1973 | Raistakka | 405/83 |
| 3,938,340 A | * | 2/1976 | Downs | 405/83 |
| 4,437,431 A | * | 3/1984 | Koch | 405/83 |
| 4,516,528 A | * | 5/1985 | Jones | 119/226 |
| 4,740,105 A | * | 4/1988 | Wollander | 405/83 |
| 6,543,968 B2 | * | 4/2003 | Robinson | 405/104 |
| 2002/0187006 A1 | * | 12/2002 | Burns | 405/81 |

FOREIGN PATENT DOCUMENTS

| | | | | |
|---|---|---|---|---|
| GB | 2138661 | * | 10/1984 | |
| JP | 04149306 | * | 5/1992 | 405/81 |
| JP | 04200696 | * | 7/1992 | 210/255 |
| JP | 06306839 | * | 11/1994 | 405/80 |
| JP | 08266182 | * | 10/1996 | |
| JP | 09250123 | * | 9/1997 | |
| JP | 10102463 | * | 4/1998 | |
| JP | 11315528 | * | 11/1999 | |
| JP | 2000233194 | * | 8/2000 | |
| JP | 2001040645 | * | 2/2001 | |
| JP | 2003147754 | * | 5/2003 | |
| KR | 2002076650 | * | 10/2002 | |

* cited by examiner

Primary Examiner—Jong-Suk (James) Lee
(74) Attorney, Agent, or Firm—Delbert J. Barnard

(57) ABSTRACT

A bypass channel (C) for fish extends along line one side of a river, for the full length of a section of the river in which reservoirs (22, 24, 26, 28) have been created by dams (14, 16, 18, 20). The channel (C) follows the grade of the natural river. It includes an inner wall (34) that varies in height so that it is always higher than the water level in any of the reservoirs. It also includes an outer wall (36) and a bottom wall (38) which are formed on the natural terrain that borders the river and reservoirs. In at least its taller regions, the inner wall (38) may be braced by a diagonal member or a system of member (40). Water flow into the channel (C) maybe regulated by horizontal and/or vertical gates (50, 52) or some other structure for changing the cross sectional area of the channel (C).

8 Claims, 3 Drawing Sheets

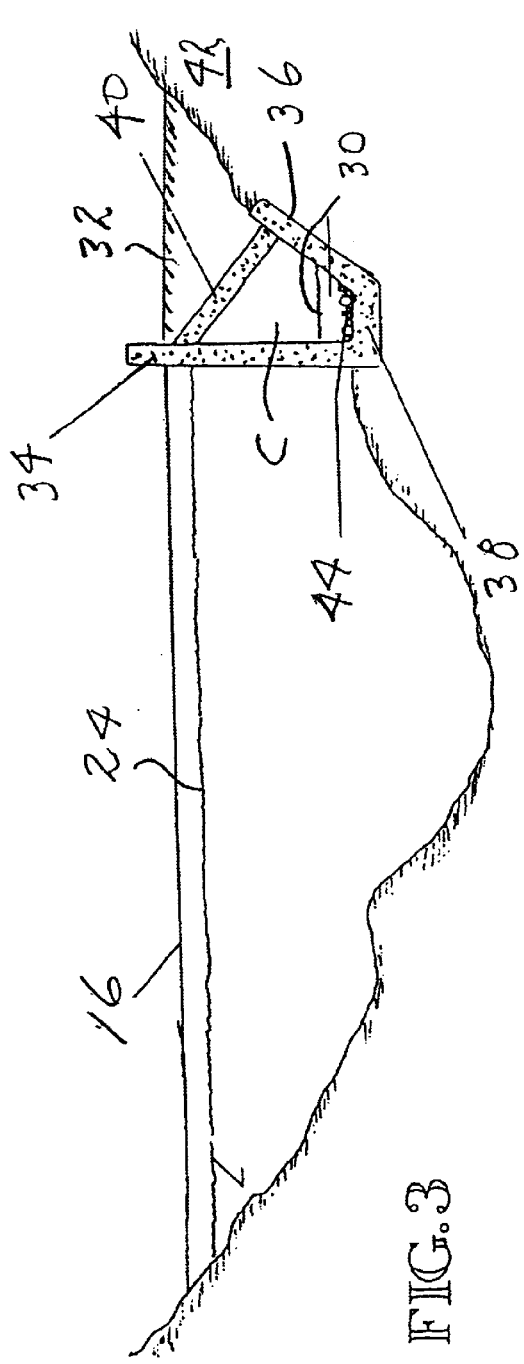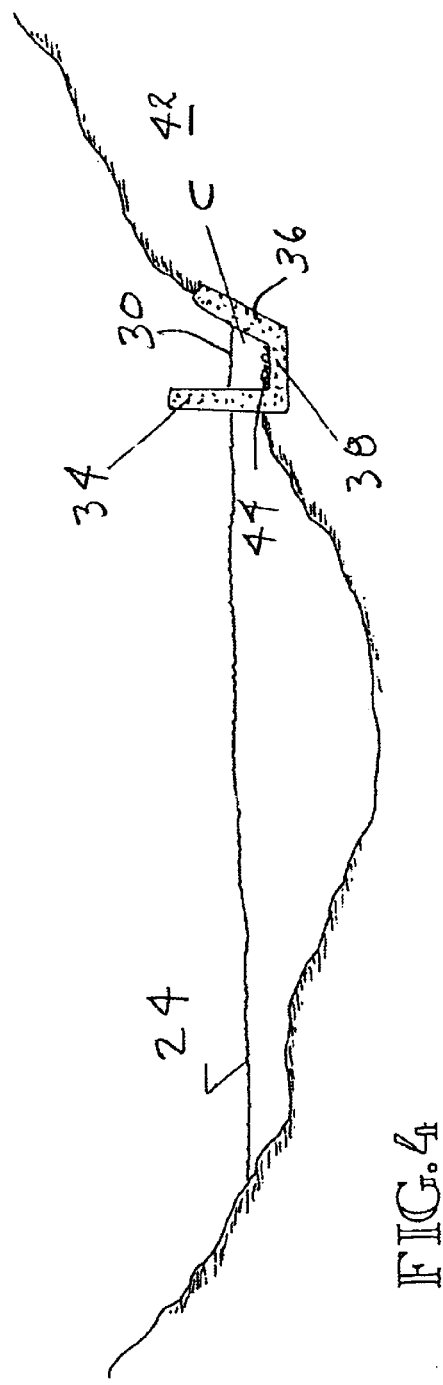

MIGRATORY FISH CHANNEL ASSOCIATED WITH ONE OR MORE DAMS IN A RIVER

RELATED APPLICATIONS

This application is a continuation-in-part of my application Ser. No. 10/324,205, filed Dec. 19, 2002 now abandoned, claiming priority on my Provisional Patent Application No. 60/342,039, filed Dec. 26, 2001.

TECHNICAL FIELD

The present invention relates to a migratory fish diversion channel for a dam or a series of dams in a river. More particularly, it relates to the provision of a man made channel that substantially follows the original grade of the land along a bank of the river when the river was a free flowing river before the construction of the dams.

BACKGROUND OF THE INVENTION

The following are prior art patent documents that disclose the use of channels for routing migratory fish around a dam in a river. U.S. Pat. No. 3,772,891, granted Nov. 20, 1973, to John E. Raistakka; U.S. Pat. No. 3,938,340, granted Feb. 17, 1976, to Dalles I. Downs; U.S. Pat. No. 4,740,105, granted Apr. 26, 1988, to Jon R. Wollander; U.S Patent Pub. No. U.S. 2002/0187006 A1, published Dec. 12, 2002, naming Gordon Charles Burns II as the inventor; Japanese Patent Publication No. JP409250123 A, published Sep. 22, 1997, listing Kunitaka Sasaki as the inventor; Japanese Patent Publication No. JP410102463 A, published Apr. 21, 1998, naming Kenichi Watabe as the inventor; Japanese Patent Publication No. JP411315528 A, published Nov. 16, 1999, naming Kunitaka Sasaki as the inventor; Japanese Patent Publication No. JP 02000233194 A, published Aug. 29, 2000, naming Masahiro Kishimoto as the inventor; Japanese Patent Publication No. JP2003147754 A, published May 21, 2003, naming Tohoku Sekizai Block Ka as the assignee; and Japanese Patent Publication No. JP404200696 A, published Jul. 21, 1992, naming Takao Tawara as the inventor.

U.S. Pat. No. 3,772,891 discloses providing a fish conduit that extends from a region below a dam to a region above the dam. The conduit is shown in the nature of sections of pipe connected together to provide a tubular conduit. Published patent application U.S. 2002/0187006 A1 teaches using a man made artificial stream in place of the tubular conduit. The stream connects a region of the river below the dam with a region of the river above the dam. The artificial stream is in the nature of a meandering nature-like channel constructed of concrete, shotcreat or gunite that simulates a waterway bed condition. The other patents of the above identified group of patents relate for the most part to specific channel structures for the passage of fish around a dam in a river.

There is a need for a simple yet effective way of providing for upstream and downstream fish migration past a series of dams in a river while retaining the economic benefits of the dams. An object of the present invention is to supply this need.

BRIEF DESCRIPTION OF THE INVENTION

The fish diversion system of the present invention is for use in a river that includes at least one dam, a river section below the dam, and a reservoir above the dam. The river section has a river bank and the reservoir has a reservoir bank. The invention is basically characterized by a fish diversion channel that extends from the river section below the dam, upstream past the dam to the reservoir, and then further upstream alongside of the reservoir. The fish diversion channel has inner and outer side walls and a bottom. The inner side wall extends upwardly from the bottom and has a top that is above the water level in the reservoir. The bottom substantially follows the grade of the ground below the channel. The inner and outer side walls and the bottom form a water passageway that substantially follows the natural grade of the reservoir bottom at the bottom of the channel. The water passageway communicates with the river section below the dam and extends upstream alongside the reservoir above the dam.

Preferably, the fish diversion system will be used with a river that includes a plurality of dams in series, including a lower dam and an upper dam. The river includes a river section below the lower dam and a river section above the upper dam. A reservoir is formed by each of the dams, each upstream of its dam. Each river section has a river bank and each reservoir has a reservoir bank. The fish diversion channel extends from the river section below the lower dam, upstream past each of the dams and alongside of each of the reservoirs, to the river section above the upper dam. The fish diversion channel has inner and outer side walls and a bottom. The inner side wall of the channel extends upwardly from the bottom of the channel and has a top that is above the water surface of each reservoir. The bottom of the channel substantially follows the natural grade of the ground. The inner and outer side walls and the bottom form a water passageway that substantially follows the natural grade of the river. This water passageway communicates with the river section below the lower dam and with a river section above the upper dam.

Dams include abutments at their ends that extend into the ground formations that are outwardly of the ends of the dam. In the vicinity of the abutment at its end of the dam, the fish diversion channel may be in the form of a tunnel opening that extends through the abutment.

According to an aspect of the invention, a variable area section may be provided in the fish diversion channel at the upper end of the reservoir for the upper dam. This variable area section is operable for controlling the flow or quantity of water that flows downstream into the fish diversion channel. In a typical embodiment, the variable area section may comprise a gate that is extendable and retractable horizontally for changing the cross sectional area of the channel. Or, it may comprise a gate that is extendable and retractable vertically, for changing the cross sectional area of the channel. Or, it may comprise both a horizontal gate and a vertical gate.

Other objects, advantages and features of the invention will become apparent from the description of the best mode set forth below, from the drawings, from the claims, and from the principles that are embodied in these specific structures that are illustrated and described herein.

BRIEF DESCRIPTION OF THE SEVERAL FIGURES OF THE DRAWING

Like reference numerals referred to like parts throughout the several views of the drawing, and:

FIG. 3 is a cross sectional view of the river and a migratory fish bypass channel at the deep end of a reservoir behind one of the dams, such a view being taken substantially along line 3—3 of FIG. 2;

FIG. 4 is a cross sectional view of the river at the upper or shallow end of the reservoir, taken substantially along line 4—4 of FIG. 2.

DETAILED DESCRIPTION OF THE INVENTION

The diversion channel of the present invention makes it easier for fish to locate and negotiate than the fish ladders currently being used at most dams. This is because the grade level of the water in the channel substantially follows the grade level of the land before the dams were constructed. As a result, the path to be traveled by the fish in the channel is much less steep than the path to be traveled in a fish ladder and there is a corresponding reduction in the velocity of the water flowing through the channel. The channel would appeal to downstream migrating baby fish (e.g., fingerlings) because it has the appearance of a natural stream. It is also beneficial to the fish as opposed to the slow moving reservoir behind each dam because in the reservoirs the water temperature is higher and the amount of oxygen is less than provided by the water in the channel.

According to the present invention, the channel is made to substantially follow the original grade of the river in which the dams were built. The side walls and bottom of the channel are made of concrete or some other durable material. The side wall adjacent the water has a top that is above the water surface at each location along the length of the river. The channel depth and width are sufficient to provide a bypass stream that is conducive to the movement and spawning of migratory fish. The bottom of the channel is preferably covered with natural rocks and gravels so as to simulate a natural stream bottom.

Figure 1:
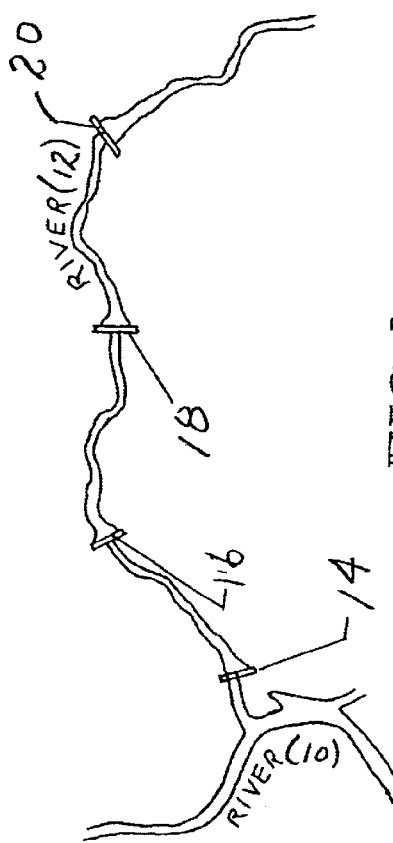
FIG. 1 is a top plan view of a river that includes a series of four dams.
Figure 2:
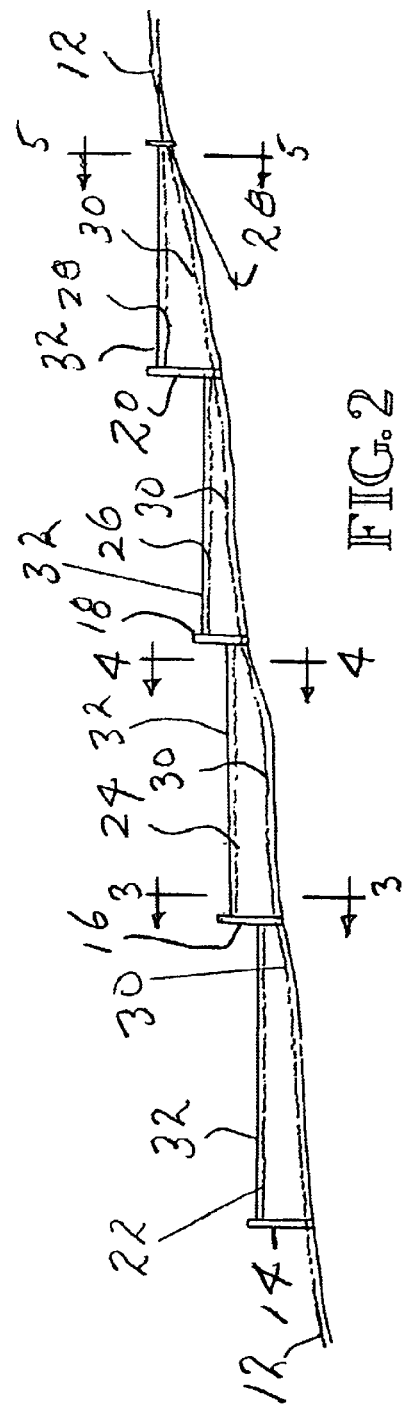
FIG. 2 is a diagram showing the natural grade of the land and the region of the four dams and the reservoirs that are formed by the dams.

Referring to the drawing figures, which are not to scale, FIGS. 1 and 2 show, for example, the four dams that are on the Snake river 12 above where the river 12 connects with the Columbia river 10. This is roughly a one hundred and fifty mile stretch of river that has been divided by the dams into a system of reservoirs that are separated by the dams. The bypass channel provided by the present innovation could be constructed around some or all of these dams and their associated reservoirs. In the example shown by FIGS. 1 and 2, "Ice Harbor" dam is designated 14. "Lower Monumental" dam is designated 16. "Little Goose" dam is designated 18. "Lower Granite" dam is designated 20. The water level in the four reservoirs is designated 22, 24, 26, 28. The water level in the bypass channel C is designated 30. This channel C connects the river region 12 below the lower dam 14 with the river region 12 above the upper reservoir 28. In FIG. 2, the concrete walls that bound the channel on the water side of the channel are designated 32. FIGS. 1 and 2 show the bypass channel by passing all four of the dams, 14, 16, 18, 20. Alternatively, the bypass channel C could be constructed to move past only one, two or three of the dams and their associated reservoirs.

FIG. 3 is a cross sectional view taken substantially along line 3—33 of FIG. 2. This figure illustrates the cross sectional shape of the reservoir and the bypass channel C closely adjacent the dam 16 adjacent the lower end of reservoir 24. FIG. 3 shows that in the vicinity of the dam 16, the channel C is formed by an inner wall 34, and outer wall 36, a bottom 38 and a reinforcing member 40. The reinforcing member 40 is necessary because the wall 34 is at its tallest where it needs the dam 16 at the lower end of the reservoir. The concrete structure 34, 36, 38, 40 may be incorporated within an abutment 32 at the channel end of the dam 16 if such an abutment is deemed necessary and is employed. The abutment 32 may include wall 34 and extend over to the bank 42, with the channel C being formed by a passageway that is formed in the abutment structure running in the direction of the river, alongside wall 34. In some installations, inner and outer walls 34, 36 may be employed and the structure 40 may be a series of diagonal struts 40 interconnecting portions of the walls 34, 36.

FIG. 3 shows that the water level 30 in the channel C is substantially below the water level 24 in the reservoir. The water level 24 in the reservoir is at a constant height and determined by the height of the dam, whereas the water level 30 in the channel slopes upwardly and downwardly as it follows the natural slope of the land. This is shown by FIG. 2. FIG. 3 shows natural rocks and gravel 44 provided on the channel bottom 38 so as to simulate the bottom of a natural stream. The size of the rocks can vary, between gravel size and boulder size, if desired.

FIG. 4 is a cross sectional view taken substantially along line 4—4 of FIG. 2. It presents a cross sectional view of the river adjacent the upper end of the reservoir 24. FIG. 4 shows that at the upper end of the reservoir 24, the water level 30 in the channel C is close in height to the water level in the reservoir 24. At this end of the reservoir 24, the height of the wall 34 is much lower than it is adjacent the dam 16. At this location, it may not be necessary to employ a connecting structure 40, so one is not illustrated. As shown by FIG. 2, each channel wall 34 varies in height from its lower end up to its upper end. At some location between the lower dam (e.g., 14) and the upper dam (e.g., 16), the need for a supporting or bracing structure 40 may disappear and above that location the supporting or bracing structure may be eliminated.

The shape of the lower portion of the channel C may be substantially constant throughout the length of the channel C. FIG. 4 shows an example minimum height of the 15 channel C. FIG. 3 shows an example maximum height of the channel C. As shown by FIG. 2, the water level 30 remains substantially constant throughout the length of the channel C. By way of an example, the depth of the water in the channel C may be approximately six to ten (6–10') feet. This depth may be substantially constant throughout the full length of the channel C.

Figure 5:
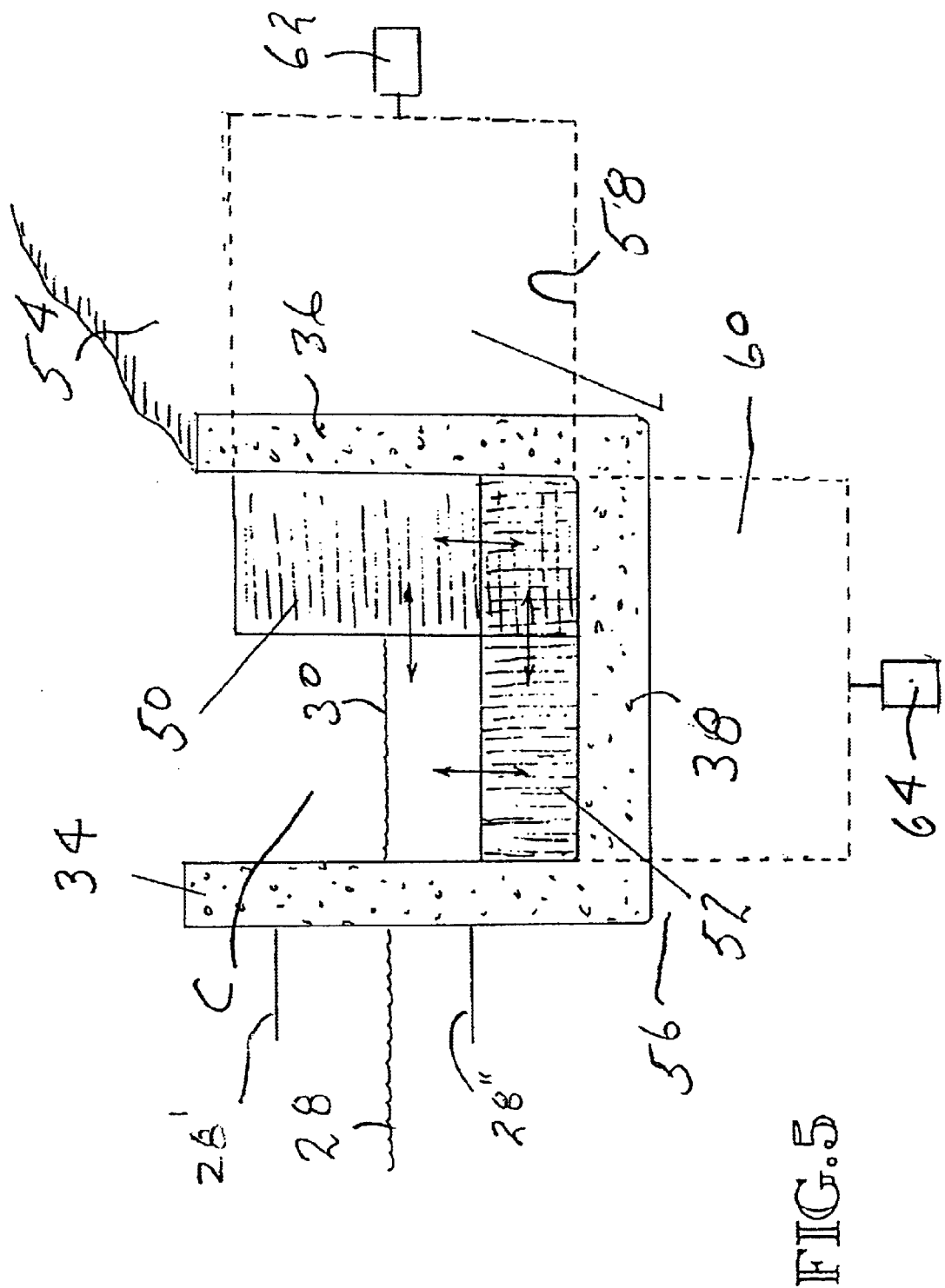
FIG. 5 is a cross sectional view of a section of the bypass panel that has been provided with gates for maintaining a substantially constant flow into the channel as the water level in the river/reservoir fluctuates.

FIG. 5 is a cross sectional view taken substantially along line 5—5 of FIG. 2. It shows the shape of the channel C at the upper end of the upper reservoir 28. In the region shown by FIG. 5, the channel C may be provided with a horizontal control gate 50 and a vertical control gate 52. A pocket for receiving the horizontal gate 50 may be formed in the material 54 located laterally outwardly of the wall 36. A pocket for the gate 52 may be formed in the material 56 below the channel bottom 38. These pockets are designated 58, 60 in FIG. 6. Hydraulic actuators 62, 64 may be provided for extending and retracting the gates 50, 52. The gates 50, 52 and their actuators 62, 64 may be like or similar to the gates and actuators that are used in irrigation water passageways.

FIG. 5 for example shows a highwater height 28' of the reservoir 28 and a low level height 28" of the reservoir 28. The gates 50, 52 are used to regulate the amount of water entering into the channel 30 as the water level varies between the high and low levels 28', 28". The system shown by FIG. 5 is only one of a number of systems that could be used for regulating the water flow into the channel C. As well be evident, movement of the horizontal gate 50 to the right, as illustrated, will narrow the size of channel C. Movement of the vertical gate 52 upwardly will lower the depth of the water entering into the channel C. The opposite movement of the gates 50, 52 will increase the cross sectional area opening permitting water flow into the channel C.

The use of the wall spaced inwardly of the water from the natural reservoir bank makes possible the construction of a fish diversion channel that allows upstream and downstream fish migration on a grade approximating that of a natural stream. As described above, and as illustrated in the drawing, the channel C uses the shoreline on one side of the reservoir and a wall made of a concrete or other suitable material that is spaced from the shoreline. The benefits of the resulting fish diversion channel C include retaining the existing dams for navigation, irrigation, recreation, hydropower and fish/wildlife maintenance, while providing for improved migrating fisheries. The channel provides for easy upstream migration by the fish when they are spawning, a natural downstream migration for smolts, considerable additional spawning grounds, swifter water flow in the channel to reduce heat absorption by the water in the channel and the fish that would occur if the fish and water had to pass through the warm water of the reservoirs, and eliminates the need for the smolts to go over the dams and suffer nitrogen poisoning, or go through the turbines and be destroyed. Additionally, the fish diversion channel system of the invention would save the cost of removing the dams, thus retaining the economic benefits of the dams. It would avoid resorting to the use of trucks to transport grain/lumber, making unnecessary the resulting fuel consumption, safety hazards, road erosion and air pollution. If the fish diversion channel is made of concrete or other durable material, it would last as long as the dams themselves. The water flow in the fish diversion channel can be directly controlled to facilitate optimal flow for fish unaffected by the remainder of the river as it flows through the dams. Currently, the fish get only the remaining water left over from the dams. Also avoided would be an estimated ten years of destruction of spawning habitats by silt flow if dams are removed.

Given the information that is set forth above, one could construct other embodiments of the present invention. The systems that have been described are all presented for purposes of illustration and not limitation. I am only to be limited to the wording of the claims which follow, and interpreted in accordance with the rules of patent claim interpretation, including use of the doctrine of equivalents.

What is claimed is:

1. A fish diversion system, comprising:
   a river including a dam, a river section below the dam, and a reservoir above the dam, said river section having a river bank and said reservoir having a reservoir bank; and
   a fish diversion channel extending upstream from the river section below the dam, past the dam to the reservoir, and then extending further upstream alongside of the reservoir, said fish diversion channel having inner and outer side walls and a bottom, said bottom substantially following the grade of the ground, said inner side wall extending upwardly from the bottom and having a top that in its extent along side the reservoir is above the water level in the reservoir, said inner and outer side walls and said bottom forming a water passageway that as it extends upstream from the dam substantially follows the natural grade of the reservoir bottom adjacent the reservoir bank, and said water passageway communicating with the river section below the dam and extending upstream alongside the reservoir above the dam.

2. The fish diversion system of claim 1, wherein said dam is a first dam, said system further comprising a second dam in the river above the reservoir for the first dam, and a second reservoir above the second dam, wherein the fish diversion channel extends upstream from alongside the reservoir for the first dam then past the second dam and then upstream alongside the reservoir for the second dam, wherein the inner wall of the fish diversion channel has a top that throughout its full length is above the water surface of the second reservoir, and wherein the bottom of the water passageway substantially follows the grade of the ground as if extends upstream from the second dam alongside of the second reservoir.

3. A fish diversion system, comprising:
   a river including a plurality of dams in series, including a lower dam and an upper dam, said river including a river section below the lower dam and a river section above the upper dam;
   a reservoir above each of said dams, each upstream of its dam;
   each river section having a river bank and each reservoir having a reservoir bank; a fish diversion channel extending from the river section below the lower dam, past each dam, and alongside of each reservoir, to the river section above the upper dam, said fish diversion channel having inner and outer side walls and a bottom, said bottom of the channel substantially following the grade of the ground, said inner side wall extending upwardly from the bottom and having a top that in its extent along side the reservoir is above the water surface of the reservoir, said inner and outer side walls and said bottom forming a water passageway that throughout the full length of the channel substantially follows the natural grade of the river, and said water passageway communicating with the river section below the lower dam and with the river section above the upper dam.

4. The fish diversion system of claim 3, comprising at least three dams and three reservoirs.

5. The fish diversion system of claim 3, comprising at least four dams and four reservoirs.

6. The fish diversion system of claim 3, comprising a variable area section in the fish diversion channel at the upper end of the reservoir for the upper dam, for controlling the flow of water downstream into the fish diversion channel.

7. The fish diversion system of claim 6, wherein the variable area section of the fish diversion channel includes at least one extendable retractable gate for changing the cross sectional area of the channel at its location.

8. The fish diversion system of claim 7, comprising two extendable/retractable gates, one extending vertically and the other extending horizontally.

* * * * *